United States Patent
Kataria et al.

(10) Patent No.: US 8,718,040 B2
(45) Date of Patent: May 6, 2014

(54) METHOD AND APPARATUS FOR ADAPTIVE BANDWIDTH UTILIZATION IN A DIGITAL NETWORK

(75) Inventors: Deepak Kataria, Edison, NJ (US); Seong-Hwan Kim, Macungie, PA (US); David P. Sonnier, Austin, TX (US)

(73) Assignee: Agere Systems LLC, Allentown, PA (US)

( * ) Notice: Subject to any disclaimer, the term of this patent is extended or adjusted under 35 U.S.C. 154(b) by 1750 days.

(21) Appl. No.: 11/025,101

(22) Filed: Dec. 29, 2004

(65) Prior Publication Data

US 2006/0140206 A1    Jun. 29, 2006

(51) Int. Cl.
*H04L 12/66* (2006.01)
*H04L 29/06* (2006.01)
*H04L 12/56* (2006.01)

(52) U.S. Cl.
CPC ............... *H04L 65/00* (2013.01); *H04L 45/00* (2013.01); *H04L 45/02* (2013.01)
USPC ............................. 370/352; 370/353; 370/401

(58) Field of Classification Search
CPC .......... H04L 65/00; H04L 45/00; H04L 45/02
USPC ......... 370/329, 397, 390, 419, 420, 421, 422, 370/352, 401, 463, 353; 709/250
See application file for complete search history.

(56) References Cited

U.S. PATENT DOCUMENTS

| | | | |
|---|---|---|---|
| 5,991,292 A * | 11/1999 | Focsaneanu et al. | 370/352 |
| 6,647,117 B1 * | 11/2003 | Wallace et al. | 379/413 |
| 7,092,356 B2 * | 8/2006 | Rabie et al. | 370/230 |
| 7,315,538 B2 * | 1/2008 | Wright et al. | 370/352 |
| 7,317,754 B1 * | 1/2008 | Remy et al. | 375/222 |
| 7,532,571 B1 * | 5/2009 | Price et al. | 370/225 |
| 7,643,489 B2 * | 1/2010 | Wang et al. | 370/395.2 |
| 2002/0080816 A1 * | 6/2002 | Spinar et al. | 370/449 |
| 2002/0126689 A1 * | 9/2002 | Redington | 370/442 |
| 2004/0090970 A1 * | 5/2004 | Sanchez et al. | 370/397 |
| 2004/0177133 A1 * | 9/2004 | Harrison et al. | 709/220 |
| 2004/0196848 A1 * | 10/2004 | Wang et al. | 370/395.2 |
| 2004/0252698 A1 * | 12/2004 | Anschutz et al. | 370/395.21 |
| 2005/0018697 A1 * | 1/2005 | Enns et al. | 370/401 |
| 2006/0104240 A1 * | 5/2006 | Sebire et al. | 370/329 |
| 2006/0120368 A1 * | 6/2006 | Aboukarr et al. | 370/390 |
| 2006/0146863 A1 * | 7/2006 | Spinar et al. | 370/449 |
| 2008/0062877 A1 * | 3/2008 | Chen | 370/235 |
| 2008/0095188 A1 * | 4/2008 | Remy et al. | 370/468 |
| 2008/0253394 A1 * | 10/2008 | Spinar et al. | 370/468 |

FOREIGN PATENT DOCUMENTS

| | | |
|---|---|---|
| EP | 1 427 132 A2 | 6/2004 |
| EP | 05 25 5006 | 5/2006 |
| JP | 2003-008633 A | 1/2003 |
| WO | WO 2004/045129 A2 | 5/2004 |

* cited by examiner

*Primary Examiner* — Chuong T Ho
(74) *Attorney, Agent, or Firm* — Ryan, Mason & Lewis, LLP (57) ABSTRACT

An integrated circuit device for use in a line card of a network node of a digital networking system is provided. The integrated circuit device is capable of intercepting one or more control messages from at least one CPE device. The one or more control messages correspond to at least an operational status of at least one TE device associated with the at least one CPE device. The integrated circuit device is also capable of transmitting one or more rate control messages to a network processor of the network node to adapt bandwidth utilization and provide adapted data traffic flow to at least one CPE device in relation to the operational status of the at least one TE device.

20 Claims, 6 Drawing Sheets

| PORT | EN0 | CHANNEL0 | EN1 | CHANNEL1 | EN2 | CHANNEL2 | EN3 | CHANNEL3 |
|---|---|---|---|---|---|---|---|---|
| 0 | 1 | 11 | 1 | 11 | 1 | 3 | 1 | 10 |
| 1 | 0 | - | 0 | - | 0 | | 0 | - |
| 2 | 1 | 1 | 1 | 2 | 1 | 4 | 1 | 14 |
| 3 | 1 | 2 | 1 | 3 | 1 | 5 | 1 | 100 |
| 4 | 1 | 3 | 1 | 4 | 1 | 6 | 1 | 10 |
| ... | | | | | | | | |
| ... | 1 | 4 | 1 | 1 | 1 | 7 | 1 | 14 |
| 123 | 0 | - | 0 | - | 0 | - | 0 | - |

METHOD AND APPARATUS FOR ADAPTIVE BANDWIDTH UTILIZATION IN A DIGITAL NETWORK

CROSS REFERENCE TO RELATED APPLICATIONS

This application is related to U.S. patent application Ser. No. 10/999,703, entitled "Method and Apparatus for Improved Data Channel Transmission in a Digital Network," which was filed on Nov. 30, 2004 and is incorporated by reference herein.

FIELD OF THE INVENTION

The present invention relates generally to the field of digital networking systems and, more particularly, to improved techniques for adapting bandwidth utilization for distribution to end users in a digital network.

BACKGROUND OF THE INVENTION

Traditional data channel transmission techniques include for example, data channel multicasting, which may be employed in a digital subscriber line access multiplexer (DSLAM) network. A DSLAM network provides an end user, at a terminal or other endpoint, with the ability to switch between streams of data, or data channels, received from an upstream source. A DSLAM network is typically designed to accommodate a variety of different types of data channels, such as, for example, a number of video channels as well as channels associated with user data, voice and gaming traffic. The endpoints of a DSLAM platform are customer premises equipment (CPE) devices, which may include, for example, modems at a residence or business and set top boxes (STBs) for terminal equipment (TE) devices, such as televisions. TE devices may also include computers, personal digital assistants (PDAs), telephones or other types of communication terminals. CPE devices include all devices at a customer end, including TE devices. However, for illustrative purposes, TE devices have been distinguished from CPE devices in describing the invention. A DSLAM network enables the delivery of any of the available channels to an end user while simultaneously allowing the end user to use the data, voice and gaming channels.

An end user may select one data channel from a set of channels that are broadcasting at a given time. An Internet group multicast protocol (IGMP) signal has traditionally been used to effect this channel selection by sending an IGMP control message from a CPE device of the end user through the DSLAM network and to a broadband remote access server (B-RAS). The channel selection is conveyed upstream in order to effect the switch to a newly selected channel. In DSLAM applications utilizing a central office (CO), the CO polls for IGMP control messages. A CO may support a large number of CPE devices.

Within the CO, a defined amount of bandwidth is allocated to each modem or end user in a DSLAM network for transmission of selected channels to individual TE devices. When a TE device connected to a modem is turned off, the unused or residual bandwidth attributed to the modem is not used elsewhere, and thus not allocated to other TE devices of that modem. In order to support multiple channel utilization, traditional solutions allocate a large amount of bandwidth to each modem resulting in significant bandwidth wastage when TE devices are off as well as higher costs in providing data channel multicasting.

Thus, a need remains for a technique that improves channel bandwidth utilization, as well as a technique for using residual bandwidth in the active TE devices of an individual modem or other CPE device.

SUMMARY OF THE INVENTION

The present invention in an illustrative embodiment provides a digital networking system with adaptive bandwidth utilization for TE devices of a modem or other CPE device depending on individual TE device operational status.

In accordance with one aspect of the invention, an integrated circuit device for use in a line card of a network node of a digital networking system is provided. The integrated circuit device is capable of intercepting one or more control messages from at least one CPE device. The one or more control messages correspond to at least an operational status of at least one TE device associated with the CPE device. The integrated circuit device is also capable of transmitting one or more rate control messages to a network processor of the network node to adapt bandwidth utilization and provide adapted data traffic flow to at least one CPE device in relation to the operational status of the at least one TE device.

An apparatus for use in a network node of a digital networking system comprises at least one line card. The line card comprises an integrated circuit device capable of intercepting one or more control messages from at least one CPE device. The one or more control messages correspond to at least an operational status of at least one TE device associated with the at least one CPE device. The integrated circuit device is also capable of transmitting one or more rate control messages to a network processor of the network node to adapt bandwidth utilization and provide adapted data traffic flow to at least one CPE device, in relation to the operational status of the at least one TE device.

A method of providing adaptive bandwidth utilization in a digital networking system is provided in which one or more control messages from at least one CPE device are intercepted at an integrated circuit device of at least one line card of a network node. Each control message corresponds to at least an operational status of at least one TE device associated with the CPE device. Data traffic is provided to at least one CPE device that is adapted in relation to the operational status of the at least one TE device.

Advantageously, an illustrative embodiment of the present invention improves system wide bandwidth utilization on a per modem/user basis. The improved bandwidth utilization decreases bandwidth wastage and minimizes user costs. The illustrative embodiment of the present invention also improves flow control by shaping downstream traffic.

These and other objects, features, and advantages of the present invention will become apparent from the following detailed description of the illustrative embodiments thereof, which is to be read in connection with the accompanying drawings.

DETAILED DESCRIPTION

As will be described in detail below, the present invention in the illustrative embodiment relates generally to the field of digital networking systems and, more particularly, to improved techniques for adapting bandwidth utilization for distribution to end users in a digital network.

Figure 1:
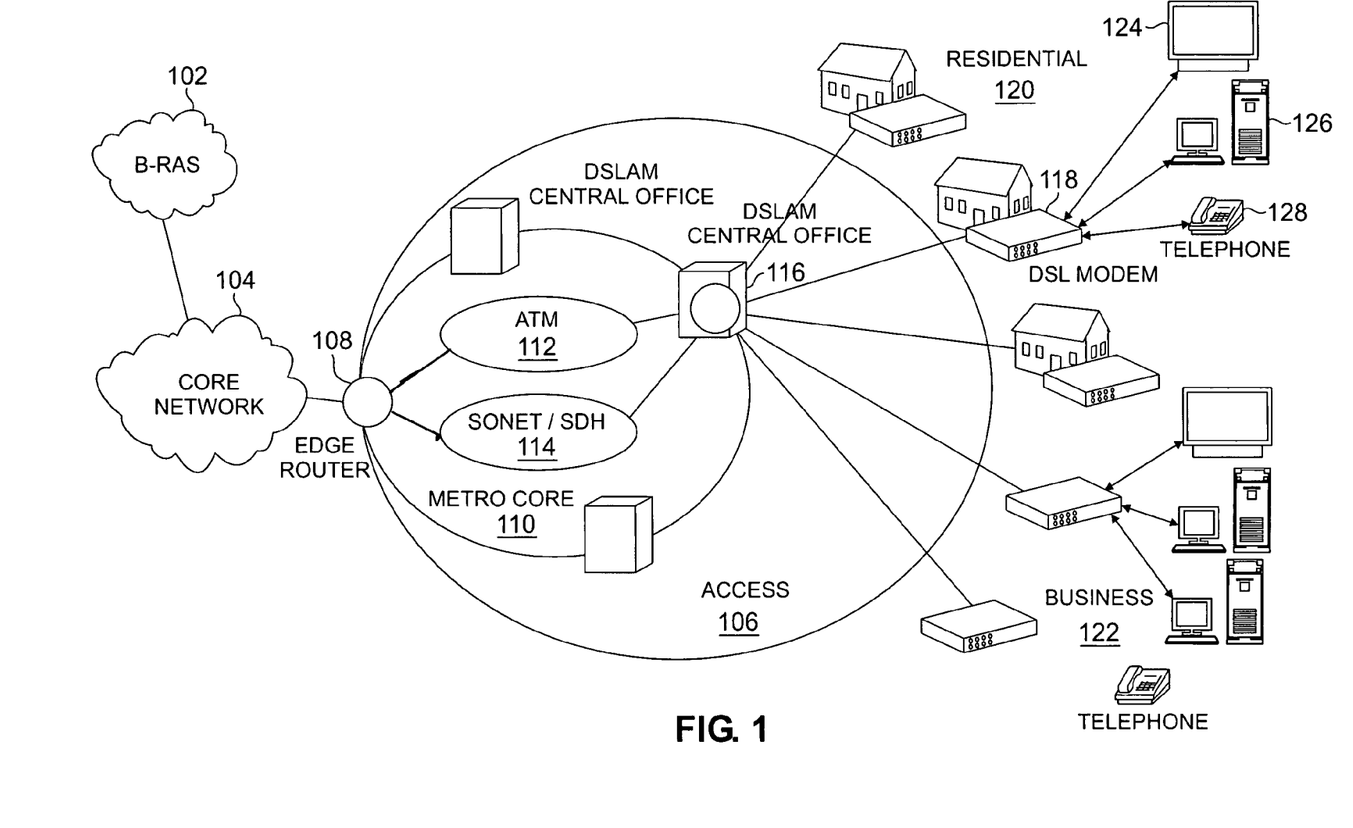
FIG. 1 is a diagram illustrating a DSLAM network, according to an embodiment of the present invention.

Referring initially to FIG. 1, a diagram illustrates a DSLAM network, according to an embodiment of the present invention. A plurality of data channels, for example, video channels, are sent from the far end of the network at B-RAS 102, through a core network 104 and into an access network 106. Core network 104 is in communication with access network 106 through an edge router 108. Edge router 108 may communicate with a network node, or more specifically, CO 116, through a metro core 110 of access network 106 via an asynchronous transfer mode (ATM) 112, synchronous optical network (SONET), synchronous digital hierarchy (SDH), Ethernet, etc. 114. SONET is the U.S. version of synchronous data transmission over fiber optic networks, while SDH is the international version of the standard. Edge router 108 may provide communication to and from several DSLAM central offices through metro core 110 of access network 106. DSLAM central office 116 is in communication with DSL modems 118 at residences 120 and businesses 122 for use, for example, with TE devices, such as a television 124, computer 126, or telephone 128.

Through the DSLAM network provided in FIG. 1, the plurality of data channels may be transmitted to CO 116 for individual distribution to TE devices 124, 126 and 128, through DSL modems 118, in response to control messages sent from CPE devices, to B-RAS 102, and intercepted by CO 116. As described above a CPE device may be considered a modem or a STB for a TE device. For example, in the embodiment illustrated in FIG. 1, a control message from TE device 124, a television, may originate from a STB for the television. This is especially the case when more than one STB is provided per modem 118. In all other cases the control message is generated at modem 118 Further, through the intercepting of control messages, CO 116 is capable of determining the operational status of TE devices 124, 126 and 128, and adapting the bandwidth utilization or flow of data traffic distributed to DSL modem 118 depending on the operational status of individual CPE devices 124, 126 and 128. For example, when TE device 124 is disabled, CO 116 adapts the data traffic flow to modem 118 so that TE device 126 may utilize the residual bandwidth.

Figure 2:
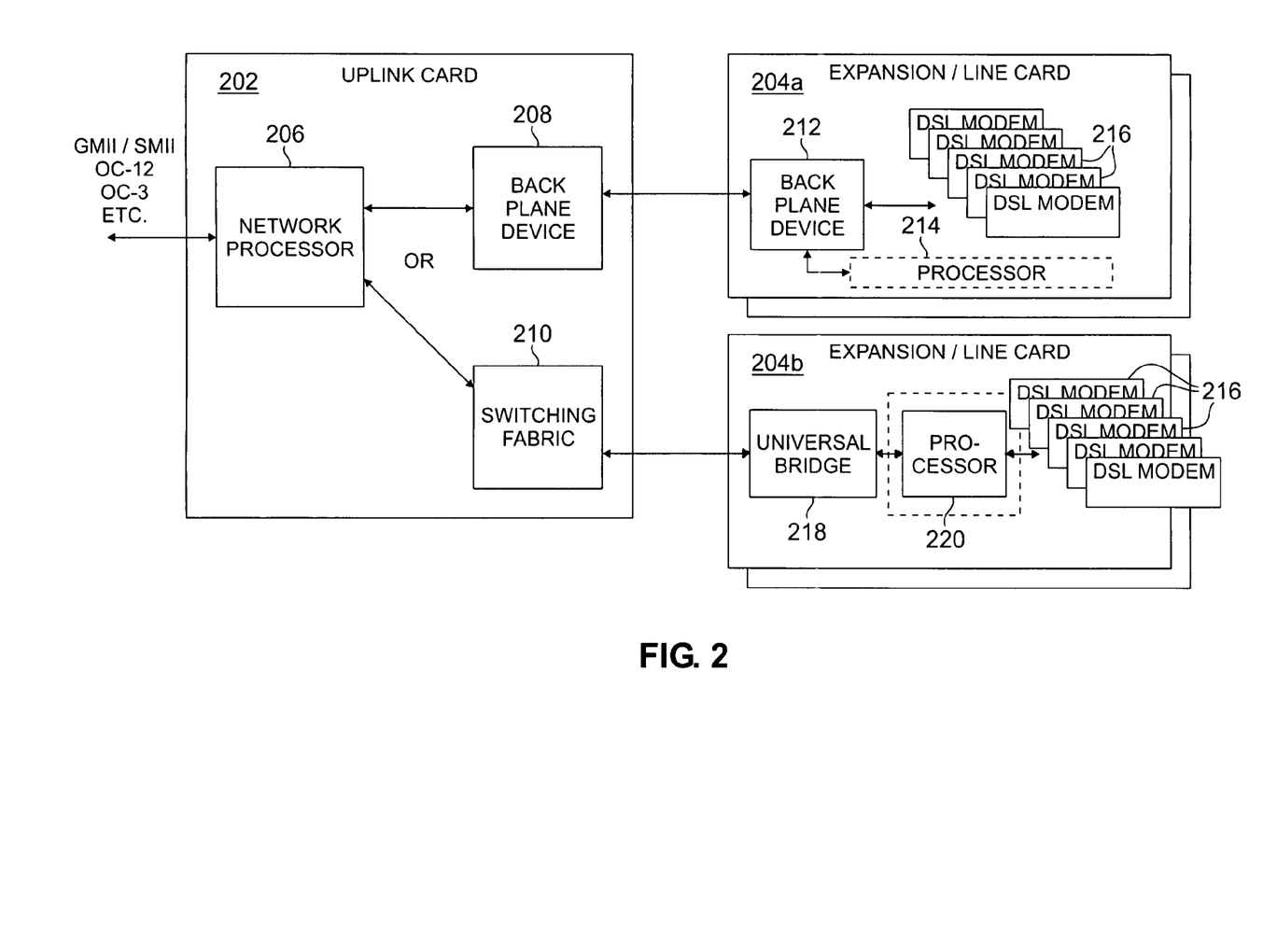
FIG. 2 is a diagram illustrating a general DSLAM central office architecture, according to an embodiment of the present invention.

Referring now to FIG. 2, a diagram illustrates a general DSLAM central office architecture, according to an embodiment of the present invention. This may be considered a more detailed view of DSLAM central office 116 of FIG. 1. An uplink card 202 communicates with at least one line card 204a, 204b. In this embodiment, uplink card 202 provides communication with upstream components of the DSLAM network through, for example, gigabit media independent interface (GMII) or serial media independent interface (SMII), through, for example, optical carrier 12 (OC-12, 622.08 Mbps) or optical carrier 3 (OC-3, 155.52 Mbps), at ATM or multi-protocol network processor 206.

Network processor 206 may communicate with a backplane device 208 or a switching fabric 210 within or outside uplink card 202. Uplink card 202 having backplane device 208, and uplink card 202 having switching fabric 210, represent two separate embodiments of the present invention. If backplane device 208 is implemented in uplink card 202, uplink card 202 communicates with one or more line cards 204a, each having a backplane device 212. The communication between uplink card 202 and line cards 204 allows a line card to transmit information relating to the operational status of TE devices to network processor 206. This communication also allows network processor 206 to provide an adapted bandwidth utilization to a line card for transmission of an adapted data traffic flow to a modem of a TE device. Backplane device 212 may utilize a processor 214 in order to implement the invention. Backplane device 212 communicates with DSL modems of the end user through DSL modems 216 of line card 204. The communication through DSL modems 216 allows CPE devices to provide control signals for interception by line card 204a, and allows line card 204a to transmit a requested data channel to a requesting TE device in association with a bandwidth specified by network processor 206 for each modem of the system. Bandwidth change requests can also be processed by the processor of the line card if this processor has the ability to control downstream traffic.

If switching fabric 210 is implemented in uplink card 202, uplink card 202 communicates with one or more line cards 204b, each having a universal bridge (UB) 218. Universal bridge 218 utilizes a processor 220 in implementing the invention and communicating with DSL modems 216 of line card 204b. DSL modems 216, modems of the end user and CPE devices perform similar functions in embodiments utilizing line cards 204a and 204b.

Figure 3:
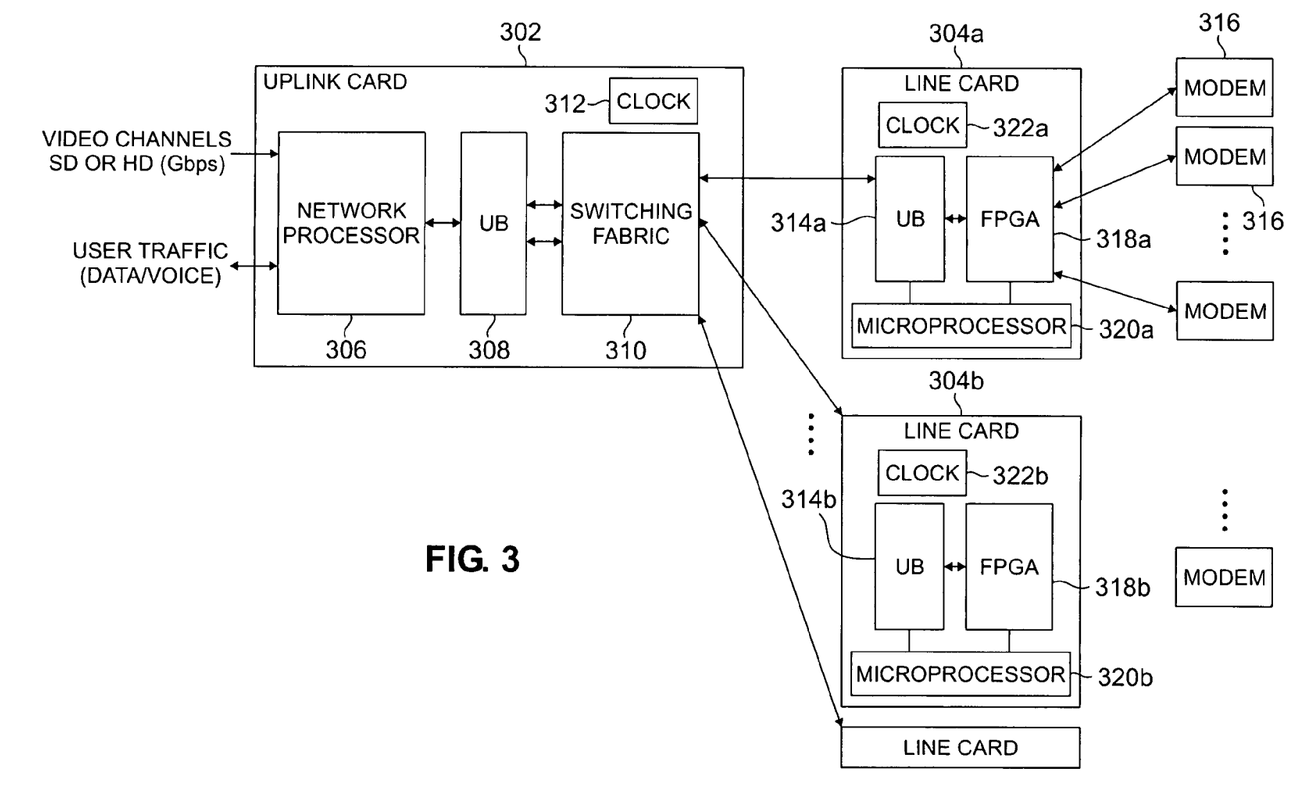
FIG. 3 is a diagram illustrating a more detailed example implementation of the FIG. 2 arrangement, according to an embodiment of the present invention.

As shown in FIG. 3, a diagram illustrates a more detailed example implementation of the FIG. 2 arrangement, according to an embodiment of the present invention. More specifically, this may be considered a detailed description of the general DSLAM central office architecture implementing a switching fabric in an uplink card. An uplink card 302 receives data channels and communicates user traffic through a network processor 306, which corresponds to network processor 206 in FIG. 2. Network processor 306 may be implemented as part APP550, commonly available from Agere Systems Inc., of Allentown, Pa., U.S.A. Network processor 306 is in communication with a UB 308, which communicates with switching fabric 310. In this embodiment of the present invention, UB 308 may be implemented as part UB2G5NP and switching fabric 310 may be implemented as parts PI40SAX, PI20SAX, which are also commonly available from Agere Systems Inc. Uplink card 302 also includes a clock 312. Uplink card 302 transmits data channels to one or more line cards 304, while also receiving necessary user traffic.

In line card 304a, a UB 314a communicates with uplink card 302 through switching fabric 310. UB 314a is also in communication with FPGA 318a and microprocessor 320a within line card 304a in order to implement the invention. Line card 304a communicates with modems 316 through FPGA 318a. The channels are transmitted to FPGA 318a from uplink card 302 and a control message is transmitted to FPGA 318a from a modem 316. A similar communication system exists with regard to line card 304b, UB 314b, FPGA 318b, and microprocessor 320b. Both line cards 304a, 304b also include respective clocks 322a, 322b.

Figure 4:
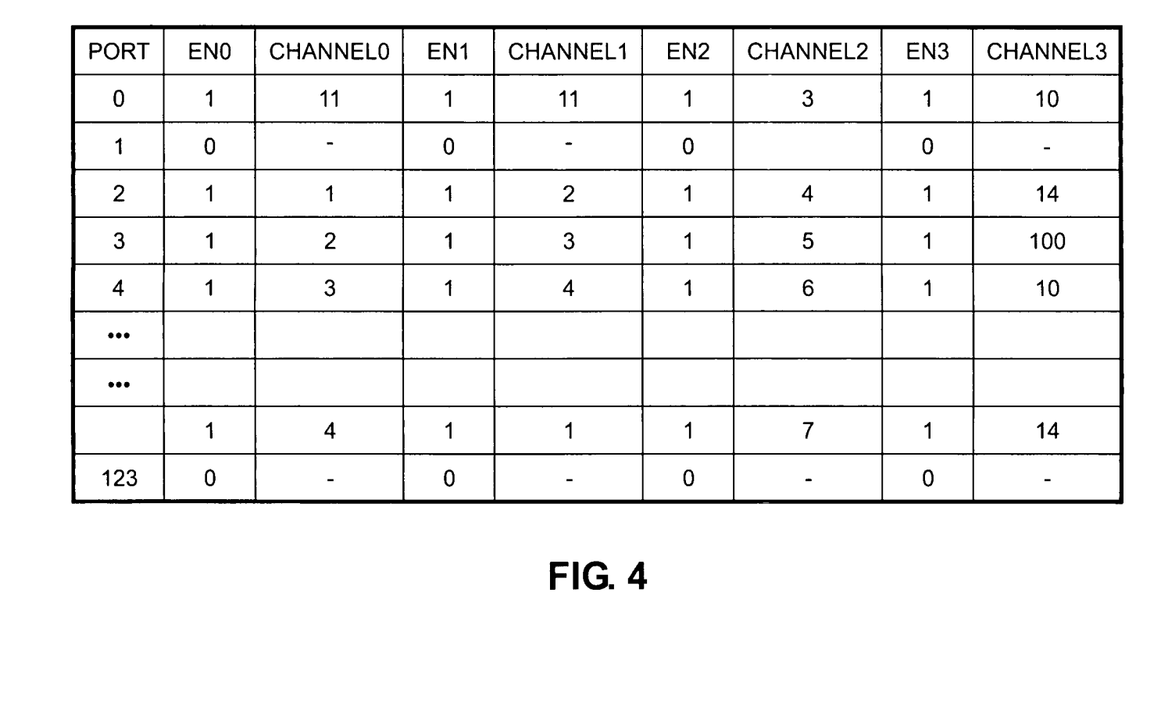
FIG. 4 is a table illustrating channel selection and status of TE devices in a DSLAM network, according to an embodiment of the present invention.

FPGA 318a, 318b in communication with processor 320a, 320b may be considered a management device of line card 304a, 304b. Such a management device of the line card may be viewed as one example of an integrated circuit device that implements the present invention. The management device maintains a table, as shown in FIG. 4. The table may be stored in an internal memory of the management device or an associated external memory. The table illustrates TE device operational status and channel selection for a specific line card. This table is used to provide and manage requested data channels for appropriate end users, while also tracking TE device enablement for adaptive bandwidth utilization purposes. The table is updated dynamically, utilizing in this embodiment a one-to-one signaling between the CPE device and the management device. When an end user enables a TE device and chooses a channel, the CPE device of the TE device, namely the modem or STB, generates a control message, for example, IGMP, that is intended to be destined to the far-end server, B-RAS. The management device in the line card of the CO intercepts the control message and uses it to dynamically update the table so that bandwidth may be adapted by the network processor based on the operational status of individual TE devices of a given modem.

An identification number of the data channel must be obtained from the control message sent from the CPE device. The table maintains the data channel ID, for example, a TV channel number, of the data channel requested by and eventually transmitted to the CPE device. In addition, the table includes an enable/disable bit for each TE device associated with the line card, to indicate whether it is on or off. The port column in the table represents the DSL modems for residences or businesses. The table in FIG. 4 illustrates 124 modems, each capable of supporting 4 TE devices, for example, 4 televisions in each house. Additional embodiments of the management device of the line card may maintain a table having 48 or 64 DSL modems.

Upon receiving an enablement or disablement signal from an intercepted control signal at the management device of the line card, the management device generates an in-band rate control (IBRC) message with port utilization information for transmission to the network processor. An initial scan of the table is necessary when the system is initialized.

Figure 5:
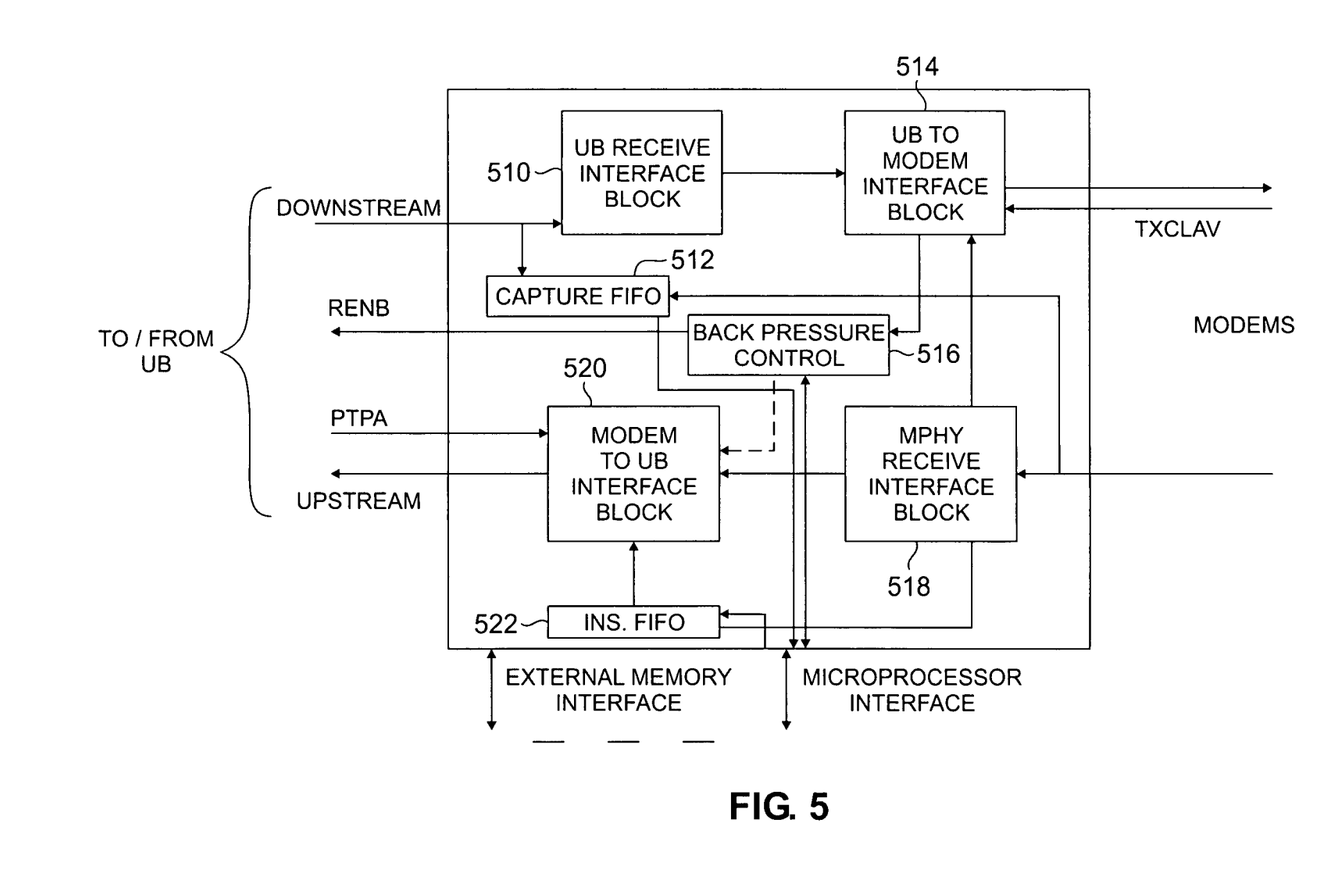
FIG. 5 is a diagram illustrating function blocks of an FPGA device in a DSLAM network, according to an embodiment of the present invention.

Referring now to FIG. 5, a block diagram illustrates functional blocks of an FPGA device, according to an embodiment of the present invention. This may be considered a detailed description of FPGA device 318 in FIG. 3. A downstream signal is received at a UB receive interface block 510 from a UB, which may implemented as part UB2G5, commonly available from Agere Systems Inc. UB receive interface block 510 maintains the table indicating the channel selection and operational status of the TE devices, as well as a cell header translation table if required. Capture FIFO 512, extracts a signal generated from the UB for back pressure control purposes, as will be described below, and transmits to the microprocessor interface. A UB to modem interface block 514 receives transmissions from UB receive interface block 510 and provides transmission of requested channels to requesting CPE devices, more specifically modems and STBs.

If a modem's receive interface suffers from congestion, the modem should ignore the FPGA device's polling to avoid overflow in the modem. Specifically, when back pressure comes from the modem (negated TXCLAV when UTOPIA interface is used), the FPGA device should not send traffic to the modem and should maintain individual per port back pressure status. If the FPGA device suffers from congestion, it will generate a flow control message (negated RENB when SPI3 interface is used) and send it upstream.

A multi physical layer (MPHY) receive interface block 518 receives control messages from the CPE devices. A modem to UB interface block 520 receives a transmission from MPHY receive interface block 518 and generates TM cells for transmission to UB2G5. Insertion FIFO 522 inserts the IBRC message generated from a back pressure control block 516 and from the microprocessor for transmission upstream to the network processor for adaptive bandwidth utilization. A polled-PHY transmit packet available (PTPA when SPI3 interface is used) is also received at modem to UB interface block 520 from the UB.

Figure 6:
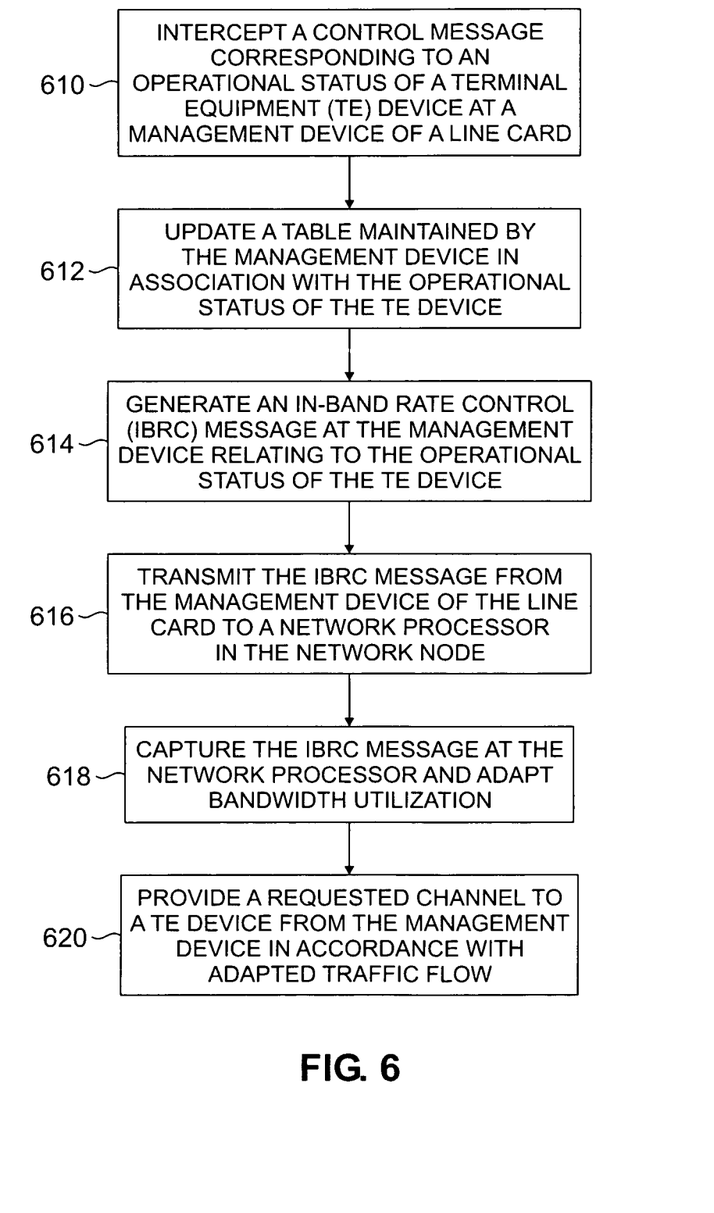
FIG. 6 is a flow diagram illustrating an adaptive bandwidth utilization methodology in a DSLAM network, according to an embodiment of the present invention.

As shown in FIG. 6, a flow diagram illustrates an adaptive bandwidth utilization methodology at a line card of a DSLAM network, according to an embodiment of the present invention. The methodology begins in block 610 where a control message corresponding to an operational status of a TE device is intercepted at a management device of a line card. The control message may also contain channel selection information and is intended for transmission to the B-RAS of the system. In block 612, a table maintained by the management device is updated in association with the operational status of the TE device. As shown in FIG. 4, an enablement bit of a given TE device may be changed to a "0" or a "1" depending on the operational status received in the control message.

In block 614, an in-band rate control (IBRC) message is generated at the management device relating to the operational status of the terminal equipment (TE) device. An IBRC message of the preferred embodiment may contain the following fields: line card number; port/modem number; and TE device operational status (on/off). The IBRC message may also include optional bandwidth information. In block 616, the IBRC message is transmitted from the management device of the line card to a network processor in the network node of the management device. As described above with regard to FIG. 5, insertion FIFO inserts the IBRC message for transmission upstream.

In block 618, the network processor captures the IBRC message and adapts bandwidth utilization. If the IBRC message indicates that a TE device is turned off, the network processor may increase the data rate for another TE device associated with the same modem or CPE device. Conversely, if the IBRC message indicates that a TE device is turned on, the network processor may decrease the data rate for another TE device associated with the same modem or CPE device. An IBRC message does not need to be generated every time a channel is changed, especially if the required bandwidth is the same or close. However, when a channel change requires a different bandwidth, the network processor may adapt traffic flow accordingly. In block 620, the management device provides a requested channel to one or more TE devices of the modem in accordance with the adapted data traffic flow. Enabled TE devices of a modem are able to use residual bandwidth resulting from a disabled TE device of the same modem. This also prevents port congestion from the management device due to traffic shaping.

Accordingly, as described herein, the present invention in the illustrative embodiment provides a digital networking system with adaptive bandwidth utilization on a per modem basis.

Additional embodiments of the present invention may incorporate multiple numbers and combinations of COs, DSL modems and TE devices. These embodiments may also incorporate different numbers and combinations of line cards associated with a single uplink card in the COs. The tables described above in each line card are based on the number of modems the line card communicates with and the number of TE devices associated with each modem. Therefore, the number of ports and channels provided in the table may also differ in additional embodiments.

In a specific embodiment of the present invention an application-specific integrated circuit (ASIC) device may be utilized in place of the FPGA device. Further, proprietary signaling from another application may be utilized in place of IGMP and IBRC messages. The invention may be implemented when any type of control message is used. Finally, the invention is not limited to uplink card-line card configurations in the CO of the illustrative embodiments. The invention may also apply to single hierarchy configurations where only a line card is utilized. As described above, the methodology may then utilize the processor of the line card in adapting bandwidth utilization for the system.

As discussed above, the management device of the present invention may be considered an integrated circuit device. Regarding integrated circuits in general, a plurality of identical die are typically formed in a repeated pattern on a surface of a semiconductor wafer. Each die may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Therefore, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An integrated circuit device for use in a line card of a network node of a digital networking system, wherein the integrated circuit device is configured:
    to intercept one or more control messages originating from at least one customer premises equipment (CPE) device, the one or more control messages corresponding to at least an updated operational status of a first one of a plurality of terminal equipment (TE) devices associated with the at least one CPE device; and
    to generate one or more rate control messages for transmission to a network processor of the network node to adapt bandwidth utilization of at least a second one of the plurality of TE devices in response to the updated operational status of the first one of the plurality of TE devices and provide adapted data traffic flow to the at least one CPE device in response to the updated operational status of the first one of the plurality of TE devices.

2. The integrated circuit device of claim 1, wherein the at least one CPE device comprises at least one modem.

3. The integrated circuit device of claim 1, wherein the plurality of TE devices comprises at least one television, and the at least one CPE device comprises at least one set top box (STB).

4. The integrated circuit device of claim 1, comprising a field programmable gate array device.

5. The integrated circuit device of claim 1, comprising an application-specific integrated circuit (ASIC) device.

6. The integrated circuit device of claim 1, wherein each of the one or more control messages comprises an Internet group multicast protocol signal.

7. The integrated circuit device of claim 1, wherein each of the one or more rate control messages comprises an in-band rate control message.

8. The integrated circuit device of claim 1, comprising a table that manages the operational status of the plurality of TE devices.

9. The integrated circuit device of claim 8, wherein the table updates dynamically in response to each intercepted control message from the at least one CPE device.

10. The integrated circuit device of claim 1, wherein the integrated circuit device is adapted to be in communication with a backplane device of the line card that is adapted to be in communication with an uplink card comprising a backplane device and the network processor.

11. The integrated circuit device of claim 10, wherein the integrated circuit device is adapted to be in communication with a processor that is adapted to be in communication with the backplane device of the line card.

12. The integrated circuit device of claim 1, wherein the integrated circuit device is adapted to be in communication with a universal bridge of the line card that is adapted to be in communication with an uplink card comprising a switching fabric and the network processor.

13. The integrated circuit device of claim 12, wherein the integrated circuit device is adapted to be in communication with a processor that is adapted to be in communication with the universal bridge of the line card.

14. The integrated circuit device of claim 1, wherein the integrated circuit device is adapted to be in communication with one or more modems for communication with the at least one CPE device.

15. An apparatus for use in a network node of a digital networking system comprising at least one line card comprising an integrated circuit device configured:
    to intercept one or more control messages originating from at least one customer premises equipment (CPE) device, the one or more control messages corresponding to at least an updated operational status of a first one of a plurality of terminal equipment (TE) devices associated with the at least one CPE device; and
    to generate one or more rate control messages for transmission to a network processor of the network node to adapt bandwidth utilization of a second one of the plurality of TE devices in response to the updated operational status of the first one of the plurality of TE devices and provide adapted data traffic flow to the at least one CPE device in response to the updated operational status of the first one of the plurality of TE devices.

16. The apparatus of claim 15, further comprising an uplink card adapted to be in communication with the at least one line card, and comprising the network processor capable of receiving the one or more rate control messages from the integrated circuit device of the line card, and adapting bandwidth utilization to provide adapted data traffic flow from the at least one integrated circuit device to the at least one CPE device in response to the updated operational status of the first one of the plurality of TE devices.

17. A method of providing adaptive bandwidth utilization in a digital networking system comprising the steps of:
    intercepting one or more control messages, each corresponding to at least an updated operational status of a first one of a plurality of terminal equipment (TE) devices, originating from at least one customer premises equipment (CPE) device associated with the plurality of TE devices, at an integrated circuit device of at least one line card of a network node;

transmitting one or more rate control messages generated by the integrated circuit device to a network processor of the network node in association with the updated operational status of the first one of the plurality of TE devices;

adapting bandwidth utilization of a second one of the plurality of TE devices in response to the updated operational status of the first one of the plurality of TE devices; and providing adapted data traffic flow to at least one CPE device in response to the updated operational status of the first one of the plurality of TE devices.

18. The method of claim 17, further comprising the step of updating a table maintained by the integrated circuit device in association with the updated operational status of the first one of the plurality of TE devices.

19. The method of claim 18, wherein the step of updating a table comprises the steps of:

determining when at least one of the plurality of TE devices is enabled; and tracking one or more data channels requested by the plurality of enabled TE devices.

20. The method of claim 17, further comprising the step of:

receiving an adapted bandwidth utilization from the network processor of the network node for adapted data traffic flow from the integrated circuit device to at least one CPE device.

* * * * *